United States Patent [19]

Ogawara

[11] Patent Number: 4,985,904
[45] Date of Patent: Jan. 15, 1991

[54] HIGH SPEED SWITCHING SYSTEM IN A RADIO-COMMUNICATION SYSTEM INCLUDING A PLURALITY OF MAIN COMMUNICATION SYSTEMS AND A PLURALITY OF STAND-BY COMMUNICATION SYSTEMS

[75] Inventor: Akihiro Ogawara, Kawasaki, Japan

[73] Assignee: Fujitsu Limited, Kawasaki, Japan

[21] Appl. No.: 524,714

[22] Filed: May 17, 1990

Related U.S. Application Data

[63] Continuation of Ser. No. 242,203, Sep. 9, 1988, abandoned.

[30] Foreign Application Priority Data

Sep. 10, 1987 [JP] Japan ................................ 62-227011

[51] Int. Cl.$^5$ ............................................. H04B 7/02
[52] U.S. Cl. .......................................... 375/38; 455/8;
  455/52; 455/133; 340/825.01; 371/8.2
[58] Field of Search ................. 455/8, 17, 52, 59, 101,
  455/133, 134, 135; 375/38, 40, 100; 340/825.01;
  371/8.1, 8.2, 68; 333/1, 3, 101

[56] References Cited

U.S. PATENT DOCUMENTS

| | | | |
|---|---|---|---|
| 2,892,930 | 6/1959 | Magnuski | 455/52 |
| 3,111,624 | 11/1963 | Farkas | 455/8 |
| 3,518,549 | 6/1970 | Sarati | 455/8 |
| 3,681,694 | 8/1972 | Sarati | 455/8 |
| 4,777,653 | 10/1988 | Bonnerot et al. | 455/52 |

Primary Examiner—Benedict V. Safourek
Attorney, Agent, or Firm—Staas & Halsey

[57] ABSTRACT

A switching system in a digital radio-communication system including a plurality of main radio-communication systems and a plurality of stand-by radio-communication systems provided for backing-up the main radio-communication systems. The switching system includes a plurality of switches independently operable from one another, the number of which is equal to the number of the stand-by radio-communication systems. Each switch switches between a stand-by radio-communication system defined in connection with the switch and a failed main radio-communication system, in a predetermined time.

9 Claims, 5 Drawing Sheets

HIGH SPEED SWITCHING SYSTEM IN A RADIO-COMMUNICATION SYSTEM INCLUDING A PLURALITY OF MAIN COMMUNICATION SYSTEMS AND A PLURALITY OF STAND-BY COMMUNICATION SYSTEMS

This is a continuation of copending application Ser. No. 07/242,203 filed on Sept. 9, 1988, now abandoned.

BACKGROUND OF THE INVENTION

1. Field of the Invention

The present invention relates to a radio-communication system, more particularly to a switching system provided in a digital radio-communication system for switching from one of a plurality of main communication systems to one of a plurality of stand-by communication systems, at a high speed.

2. Description of the Related Art

In general, a digital radio-communication system includes a plurality of main communication systems, a stand-by communication system used for backing-up one of the main communication systems when the main communication system fails, and a switching control system for switching from the main communication system to the stand-by communication system.

Recently, there has been strongly required an increase of a transmission capacity, and thus there has been developed and attempted to increase main communication systems. Accordingly, stand-by communication systems may be increased. In a prior art digital radio-communication system, only a switching from one main communication system to a single stand-by communication system is taken into account. If the prior art switching method is applied to a new digital radio-communication system which includes a plurality of main communication systems and a plurality of stand-by communication systems, and when a plurality of the main communication systems are simultaneously failed and simultaneously switched to a plurality of the stand-by communication systems, the switching may be sequentially carried out the plurality of channel. As a result, the total switching time becomes $n \times T_{SW}$, where n indicates the number of the radio-communication channels to be switched from the main communication systems to the stand-by communication systems, and $T_{SW}$ represents an actual switching time for each channel. The actual switching time is, for example, approximately 9 ms. If two main communication systems are simultaneously switched to two stand-by communication systems, the total switching time becomes approximately 18 ms. However, the total switching time after detecting a failure of the main communication systems must be within 10 ms, under the requirement of a microwave digital radio-communication system. The switching time $T_{SW}$, per se, can not be reduced. Therefore, the prior art switching method suffers from a low switching speed when a failure of two or more main communication systems occurs simultaneously.

SUMMARY OF THE INVENTION

An object of the present invention is to provide a switching system for simultaneously switching from a plurality of main communication systems to a plurality of stand-by communication systems within a predetermined time.

According to the present invention, there is provided a digital radio-communication system including: a plurality of main radio-communication systems, each including a main data transmission circuit unit provided at a first side, a main space data transmission line, and a main data reception circuit unit provided at a second side and operatively connected to the main data transmission circuit unit through the main space data transmission line; a plurality of stand-by radio-communication systems provided for backing-up said main radio-communication systems, each including a stand-by data transmission circuit unit provided at the first side, a stand-by space data transmission line, and a stand-by data reception circuit unit provided at the second side and operatively connected to the stand-by data transmission circuit unit through the stand-by space data transmission line; a first switching circuit unit provided among the main and stand-by radio-communication systems and at the first side, and including a plurality of first switching circuits for switching between the main and stand-by radio-communication systems at said first side; a second switching circuit unit provided among the main and stand-by radio-communication systems and at the second side, and including a plurality of second switching circuits for switching between the main and stand-by radio-communication systems at the second side; at least one auxiliary radio-communication system including an auxiliary data transmission circuit unit provided at the second side, an auxiliary space data transmission line, and an auxiliary data reception circuit unit provided at the first side and operatively connected to the auxiliary data transmission circuit unit through the auxiliary space data transmission line; and channel switching unit including a plurality of pairs switching unit, the number thereof being equal to the number of the stand-by radio-communication systems, and the plurality of switching unit being independently operable from one another, each pair of the switching units including a first switching means provided at the first side to activate the first switching circuits, and a second switching unit provided at the second side to activate the second switching circuits and cooperating with the first switching unit through the auxiliary data radio-communication system. Each second switching unit monitors the statuses of a plurality of the main radio-communication systems, and sends a switching command to said corresponding first switching unit when a failure in a main radio-communication system is detected. A corresponding first switching means activates a first switching circuit in the first switching circuit unit to transmit transmission data which are equal to those data transmitting through the failed main radio-communication system, through a stand-by radio-communication system which is defined in connection with the first and second switching units, in response to the switching command sent from the second switching means. The second switching unit activates a second switching circuit in the second switching circuit unit to receive the data transmitted through the stand-by radio-communication system, at the second side, in response to the switching at the corresponding first switching unit.

The second switching unit monitors only the failed main radio-communication system back-up by the stand-by radio-communication system to detect a restoration of the failed main radio-communication system and restores the failed main radio-communication system to a normal mode in which it is not backed-up by the stand-by radio-communication system when the failed main radio-communication system is returned to a normal state.

The second switching unit sends a restore switching command to the corresponding first switching unit when the failed main radio-communication system is restored. The corresponding first switching unit actives the first switching circuit in the first switching circuit unit to cut an application of the transmission data, which are equal to those data transmitting through the restored main radio-communication system, through the stand-by radio-communication system, in response to the restore switching command sent from the second switching unit. The second switching unit activates the second switching circuit in the second switching circuit unit to cut data transmitted through the stand-by radio-communication system at the second side, in response to the switching at the corresponding first switching unit.

The plurality of main radio-communication systems is divided into a plurality of monitoring groups, the number of thereof being equal to the number of the second switching units. Each of the second switching unit monitors a plurality of main radio-communication systems in a corresponding monitoring group in a normal condition. When at least one of the first switching unit detects a failure in a main radio-communication system and monitors the failed main radio-communication system to restore the same if the failed main radio-communication system can be restored. Other second switching units further monitor the main radio-communication systems in the monitoring group monitored by the fail detected second switching unit in the normal condition, except for the failed main radio-communication system, and carry out the back-up operation by using stand-by radio-communication systems defined by their second switching units together with the corresponding first switching units when detecting a failure in the monitoring main radio-communication systems.

A next second switching unit carries out the further monitoring of the main radio-communication systems in the monitoring group monitored by the failure detecting second switching unit in the normal condition, except for the failed main radio-communication system. Or, other second switching units carry out the further monitor of a plurality of main radio-communication systems approximately equivalently divided from the main radio-communication systems in the monitoring group monitored by the fail detected second switching unit in the normal condition.

A communication of a failed and backed-up main radio-communication system and the second switching unit, from the second switching unit detecting the failed main radio-communication system to other second switching units, is carried out by indicating the number of the failed main radio-communication system, and another communication of a restored main radio-communication system and the second switching unit, from the second switching unit detecting the restored main radio-communication system to other second switching units, is carried out by indicating a special datum.

Each second switching unit comprises a single micro computer operating independently from each others, and having a data transmission and reception unit for performing the above communication. Also, each first switching unit comprises a single micro computer operating independently from one another.

The plurality of second switching units is formed by a single computer which performs multi-tasks for the monitoring and switching in parallel and in real time.

Also, the plurality of first switching units are formed by another single computer which performs multi-tasks for the switching in parallel in a real time.

Each of the main data transmission circuit unit includes a main modulator, a main transmitter, and a main antenna, and each of the main data reception unit includes another main antenna, a main receiver, and a main demodulator. Also, each of the stand-by data transmission circuit unit includes a stand-by modulator equivalent to the main modulator, a stand-by transmitter equivalent to the main transmitter, and a stand-by antenna, and each of the stand-by data reception unit includes another stand-by antenna, a stand-by receiver equivalent to the main receiver, and a stand-by demodulator equivanelt to the main demodulator. The first switching circuits in the first switching circuit units are operatively connected to the plurality of main modulators and the plurality o stand-by modulators, and the second switching circuits in the second switching circuit units are operatively connected to the plurality of main demodulators and said plurality of stand-by demodulators.

The digital radio-communication system further includes: a plurality of second main radio-communication systems, each including a second main data transmission circuit unit provided at the second side and having the same circuit configuration as that of the main data transmission circuit, a main second space data transmission line, and a second main data reception circuit unit provided at the first side, having the same circuit as that of the main data reception circuit unit, and operatively connected to the main data transmission circuit unit through the main space data transmission line; a plurality of second stand-by radio-communication systems provided for backing-up, the second main radio-communication systems, each including a second stand-by data transmission circuit unit provided at the second side and having the same circuit as that of the stand-by data transmission circuit unit, a second stand-by space data transmission line, and a second stand-by data reception circuit unit provided at the first side, having the same circuit as that of the stand-by data reception circuit unit, and operatively connected to the second stand-by data transmission circuit unit through the second stand-by space data transmission line; a third switching circuit unit provided among the second main and second stand-by radio-communication systems and at the second side, and including a plurality of third switching circuits for switching between the second main and second stand-by radio-communication systems at the second side, each third switching circuit having a circuit configuration similar to that of the first switching circuit; and a fourth switching circuit unit provided among the second main and second stand-by radio-communication systems and at the first side, and including a plurality of fourth switching circuits for switching between the second main and second stand-by radio-communication systems at the first side, each fourth switching circuit having a circuit configuration similar to that of the second switching circuit. The auxiliary radio-communication system is one of the second main radio-communication system. The digital radio-communication system also includes a second channel switching unit including a plurality of pairs switching unit, the number thereof being equal to the number of the second stand-by radio-communication systems, and the plurality of switching units being independently operable from each others, each pair of the switching units including a third switching unit having the same circuit configuration as that of the first switching unit and provided at the second side to activate the third switching circuits, and a fourth switching unit having the same circuit configuration as that of the second switching unit and provided at the first side to activate the fourth switching circuits and cooperating with the third switching unit through one of the main radio-communication system, as the auxiliary radio-communication system.

BRIEF DESCRIPTION OF THE DRAWINGS

Other objects and features of the present invention will be described, below in detail with reference to the accompanying drawings, in which.

DESCRIPTION OF THE PREFERRED EMBODIMENTS

Figure 1:
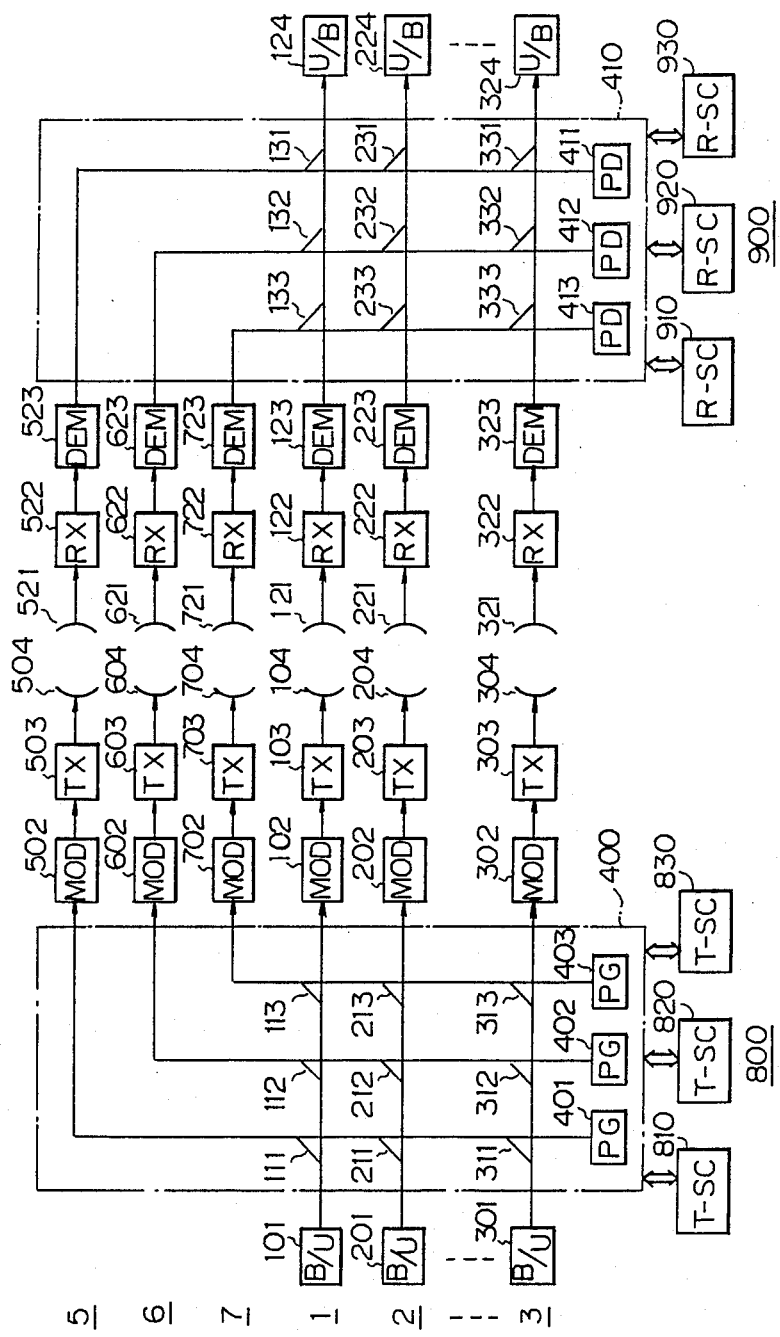
FIG. 1 is a block diagram of an embodiment of a digital ratio-communication system in accordance with the present invention.

Referring to FIG. 1, a digital radio-communication system includes a plurality of main radio-communication systems 1 to 3, three stand-by radio-communication systems 5 to 7, a transmission side switching circuit unit 400, a reception side switching circuit unit 410, a transmission side switching control unit 800, and a reception side switching control unit 900. Each main radio-communication system, for example, a first main radio-communication system 1, includes a transmission side circuit unit having a bipolar to unipolar signal converter (B/U) 101, a modulator (MOD) 102, a transmitter (TX) 103, and an antenna 104, a space data transmission channel, and a reception side circuit unit having an antenna 121, a receiver (RX) 122, a demodulator (DEM) 123, and a unipolar to bipolar converter (U/B) 124. Each stand-by radio-communication system, for example, a first stand-by radio-commnication system 5, includes a transmission side circuit unit having a modulator 502, a transmitter 503 and an antenna 504, a space data transmission channel, and a reception side circuit unit having an antenna 521, a receiver 522 and a demodulator 523. At a transmission side, the transmission side switching circuit unit 400 is provided among the bipolar-to-unipolar converter 101 and the modulators 102 and 502. The transmission side switching circuit unit 400 includes three pattern generators 401 to 403, and a plurality of switching circuits provided in parallel and corresponding to the number of the main radio-communication systems. Each switching circuit, for example, a switching circuit provided between the bipolar to unipolar signal converter 101 and the modulator 102, includes three switches 111 to 113. Also, at a reception side, the reception side switching circuit unit 410 is provided among the demodulator 523 and 123 and the unipolar to bipolar signal converter 124. The reception side switching circuit unit 410 includes three pattern detectors 411 to 413, and a plurality of switching circuits provided in parallel and corresponding to the number of the main radio-communication systems. Each switching circuit, for example, a switching circuit provided between the demodulator 123 and the unipolar-to-bipolar signal converter 124, includes three switches 131 to 133. The transmission side switching control unit 800 includes three independent switching controllers 810, 820 and 830. Also, the reception side switching control unit 900 includes three independent switching controllers 910, 920 and 930. Each transmission switching controller is formed by a microcomputer. Also, each reception switching controller is formed by a microcomputer.

In this embodiment, the number of the main radio-communication systems 1 to 3 is 150, and the number of the stand-by radio-communication systems 5 to 7 is three. The number of the reception switching controllers is equal to the number of the stand-by radio-communication systems Similarly, the number of the transmission switching controllers is equal to the number of the stand-by radio-communication systems.

Figure 2:
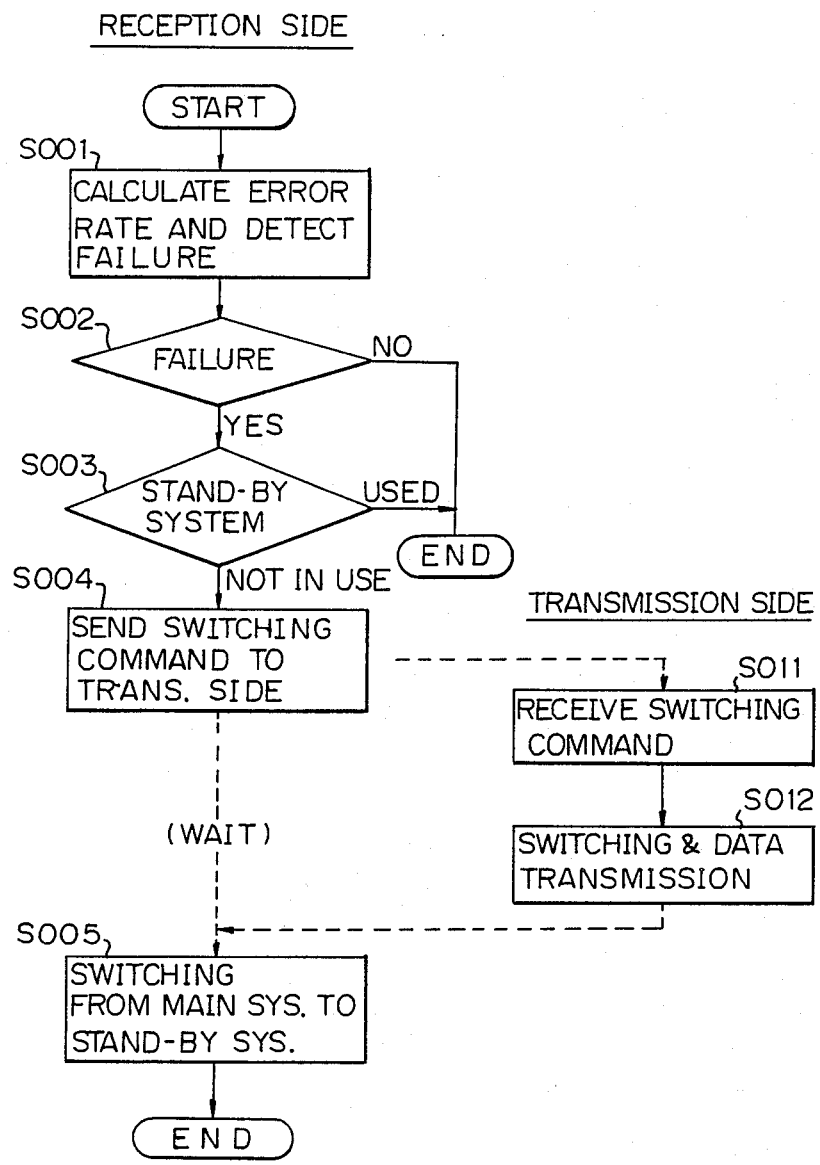
FIG. 2 is a flow chart explaining a general switching operation.

Before describing the detailed switching operation of the present invention, a general switching operation will be described with reference to FIG. 2. In this example, as a prior art, it is assumed that a single stand-by radio-communication system 5, a single transmission switching controller 800, and a single reception switching controller 900 are provided.

Steps 001 to 003 (S001 to S003)

The reception switching controller 900 calculates reception data error rates of the main radio-communication systems 1 to 3 and monitors failures in the main radio-communication systems (S001).

If a failure and/or a high data error rate in the main radio-communication system, for example, the first main radio-communication system 1, is detected (S002), the reception switching controller 900 checks whether or not the stand-by system 5 is already in use for backing up the main radio-communication system 1 (S003).

Steps 004, 001, 012, 005 (S004, S011, S012, S005)

When the stand-by radio-communication system 5 is not in use, the reception switching controller 900 sends a switching command to the transmission switching controller 800 through another main radio-communication system (not shown) provided in parallel to the main radio-communication system 1, having a construction symmetrical to that of the main radio-communication 1, and functioning as an auxiliary radio-communication system, to transmit data from the reception side to the transmission side in FIG. 1 (S004).

The transmission switching controller 800 receives the switching command, which indicates a demand for backing-up of the main radio-communication system 1 by the stand-by radio-communication system 5, through the auxiliary radio-communication system (S011).

The transmission switching controller 800 activates the switch 111 to supply data from the bipolar to unipolar signal converter 101 to the modulator 502 in the stand-by radio-communication system 5 and the modulator 102 in the main radio-communication system 1 (S012). Note, in a back-up mode, the same data are supplied to the stand-by radio-communication system 5 and the main radio-communication system 1 to be backed up, to switch the transmission channel to the main radio-communication system 1 when it is restored to a normal state.

The reception switching controller 900 activates the switch 131 to receive the data transmitted through the stand-by radio-communication system 5 (S005).

The switch 131 includes a phase adjustment circuit to match the phases of data from the demodulators 123 and 523, a switching portion for switching data from the demodulator 123 to data from the demodulator 523 after the phase adjustment, and other circuits, so that a no-hit data switching can be carried out.

Also, the reception switching controller 900 monitors the status of the main radio-communication system 1 and restores the back-up status when the main radio-communication system 1 is restored to a normal state.

In the above, a communication time between the reception switching controller 900 and the transmission switching controller 800 is approximately, 2 ms, a communication time between the transmission switching controller 800 and the reception switching controller 900 is also approximately 2 ms, each switching time in the transmission side or the reception side is approximately 2 ms, and the other operation time is approximately 1 ms. Accordingly, a total switching time for switching a single channel is approximately 9 ms. This meets the requirement of a switching time of 10 ms set forth above. However, when a failure of two or more main radio-communication systems simultaneously occurs, and a simultaneous switching from these failed main radio-communication systems to a plurality of stand-by radio-communication systems is required, if a sequential switching can be carried out, a second or succeeding switching time exceeds the above time limit. Accordingly, in a multi-back-up radio-communication system including a plurality of stand-by radio-communication systems, a parallel-switching must be adopted. To achieve this requirement, the reception switching control unit 900 is provided with three independent switching controllers 810, 820 and 830. In addition, to minimize interactions among the switching controllers 810, 820 and 830, the most simple interface threbetween must be provided.

Figure 3:
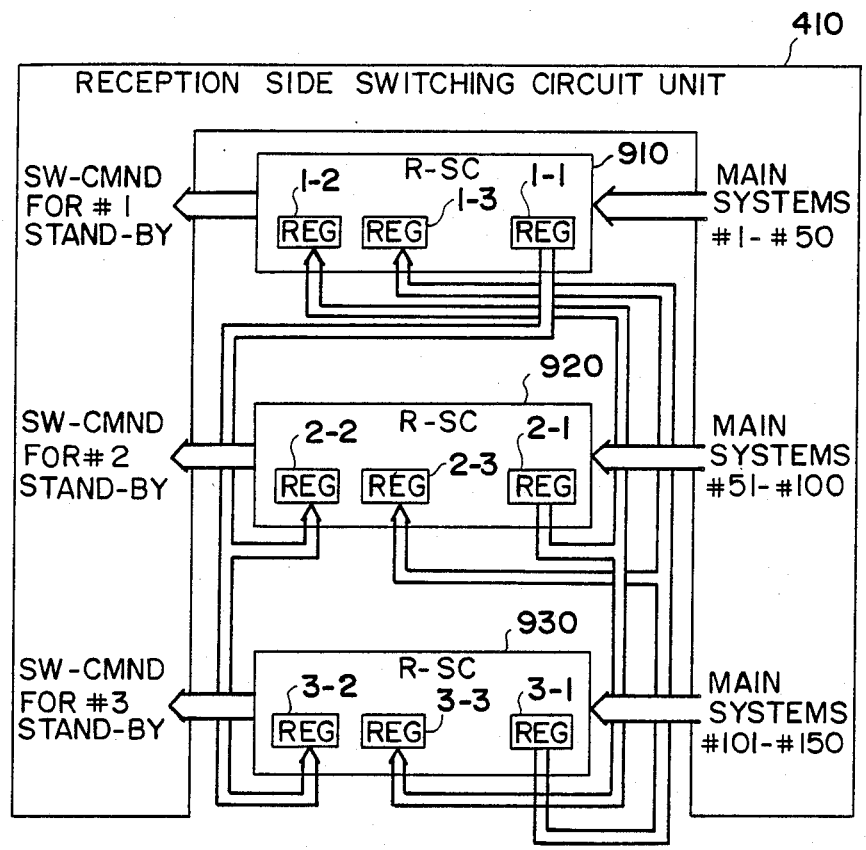
FIG. 3 is a diagram showing the relationship among the reception switching controllers shown in FIG. 1.

FIG. 3 shows the relationship among the reception switching controllers 910 to 930, and a connection between the reception side switching circuit unit 410 and the reception switching controllers 910 to 930. The relationship among the transmission switching controllers 810 to 830, and a connection between the transmission side switching circuit unit 400 and the transmission switching controllers 810 to 830 are similar to those described above.

Figure 4:
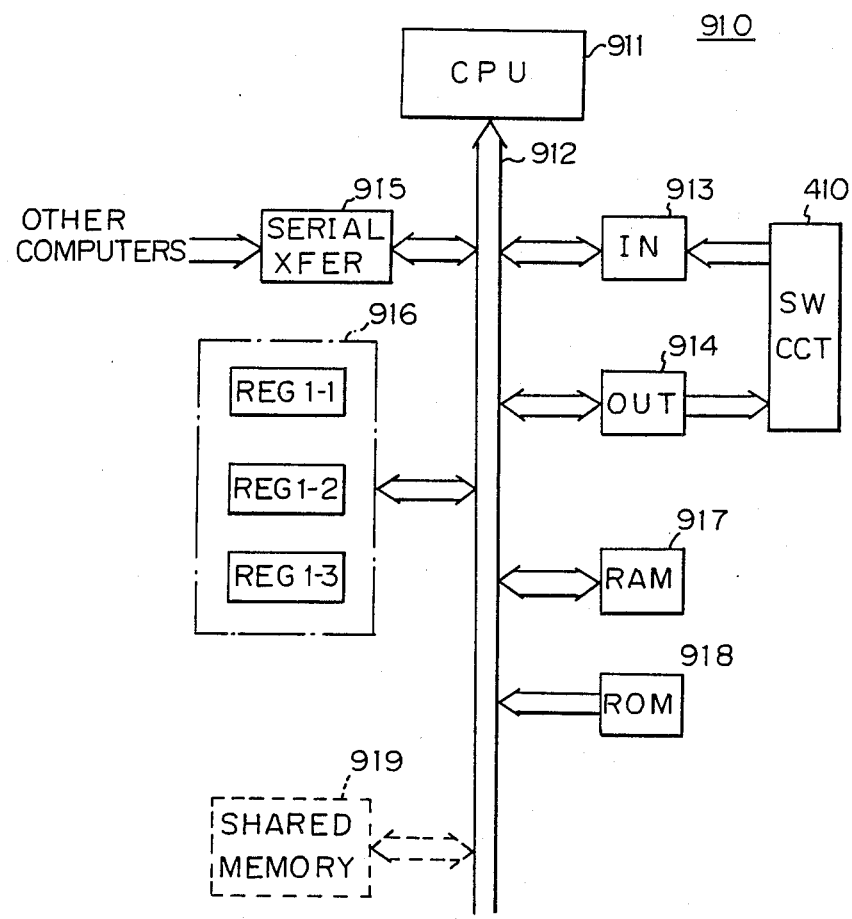
FIG. 4 is a diagram of the reception switching controller shown in FIG. 3.

FIG. 4 shows a diagram of the reception switching controller 910. The reception switching controller 910 includes a central processor unit (CPU) 911, an internal bus 912, an input unit 913 connected to the switching circuit unit 410, an output unit 914 connected to the switching circuit unit 410, a serial data transfer unit 915, a register circuit 916, a random access memory (RAM) 917, and a read-only-memory (ROM) 918. Optionally, a shared memory 918 can be provided. The register circuit 916 includes three registers 1-1, 1-2, and 1-3. The reception switching controller 910 can read all reception statuses of the main and stand-by radio-communication systems through the input unit 913. The reception switching controller 910 can also control the switching of the switches 131 to 139, to 331 to 332 in the reception side switching circuit unit 410.

The other reception switching controllers 920 and 930 have the same circuit construction as that of the reception switching controller 910.

The reception switching controllers 910 to 930 control the switching of the first stand-by radio-communication system 5 and the main radio-communication systems 1 to 3, the second stand-by radio-communication system 6 and the main radio-communication systems 1 to 3, and the third stand-by radio-communication system 7 and the main radio-communication systems 1 to 3, respectively. Namely, the first reception switching controller 910 manages the switching of the first stand-by radio-communication system 5 and one of the main radio-communication systems 1 to 3, the number thereof being 150 in this example, the second reception switching controller 920 manages the switching of the second stand-by radio-communication system 6 and one of main radio-communication systems 1 to 3, and the third reception switching controller 930 manages the switching the third stand-by radio-communication system 7 and one of main radio-communication systems 1 to 3.

In order to prevent interactions when switching among the reception switching controllers 910 to 930 by a simple interface, registers 1-1 to 1-3, 2-1 to 2-3 and 3-1 to 3-3 are provided in the reception switching controllers 910 to 930, respectively, and the serial data transfer unit 915, which transfers data to be stored into the registers, is also provided.

At an initial condition, all registers 1-1 to 1-3, 2-1 to 2-3, and 3-1 to 3-3 are cleared to zero. In this state and in a normal condition, the first reception switching controller 910 monitors the first to fifty-th (50-th) main radio-communication systems, the second reception switching controller 920 monitors the fifty-first (51-th) to one hundred-th (100) main radio-communication systems, and the third reception switching controller 930 monitors the 101-th to 150-th main radio-communication systems.

The first reception switching controller 910 activates the switch 131 to back-up the main radio-communication system, for example, the first main radio-communication system 1, by the first stand-by radio-communication system 5 when a failure is detected in the main-communication system 1 by the first reception switching controller 910, and thereafter, the first reception switching controller 910 monitors only the failed main radio-communication system 1 and the first stand-by radio-communication system 5 to cancel the back-up state when the failed radio-communication system 1 is restored to a normal state. Conversely, the second reception switching controller 920 monitors the second to 50-th main radio-communication systems, which should be monitored by the first reception switching controller 910 in a no-back-up mode, in addition to the 51-th to 100-th main radio-communication systems. The third reception switching controller 930 monitors the 101-th to 150-th main radio-communication systems.

When the second switching controller 920 detects a failure in the main radio-communication system, for example, the second main radio-communication system 2, the second switching controller 920 activates the switch 232 in the reception side switching circuit unit 410 to ensure a back-up of the main radio-communication system 2 by the second stand-by radio-communication system 6. The second reception switching controller 920 monitors the failed main radio-communication system 2 and the stand-by radio-communication system 6, in the same way as the first reception switching controller 910 as set forth above. In this case, the third reception switching controller 930 monitors the third to 100-th main radio-communication systems in addition to the 101-th to 150-th main radio-communication systems for switching a failed main radio-communication system of these main radio-communication systems to the third stand-by radio-communication system 7.

The above distribution and modification of the monitoring and back-up can be carried out by referring to the statuses of the registers 1-1 to 1-3, 2-1 to 2-3, and 3-1 to 3-3.

Figure 5:
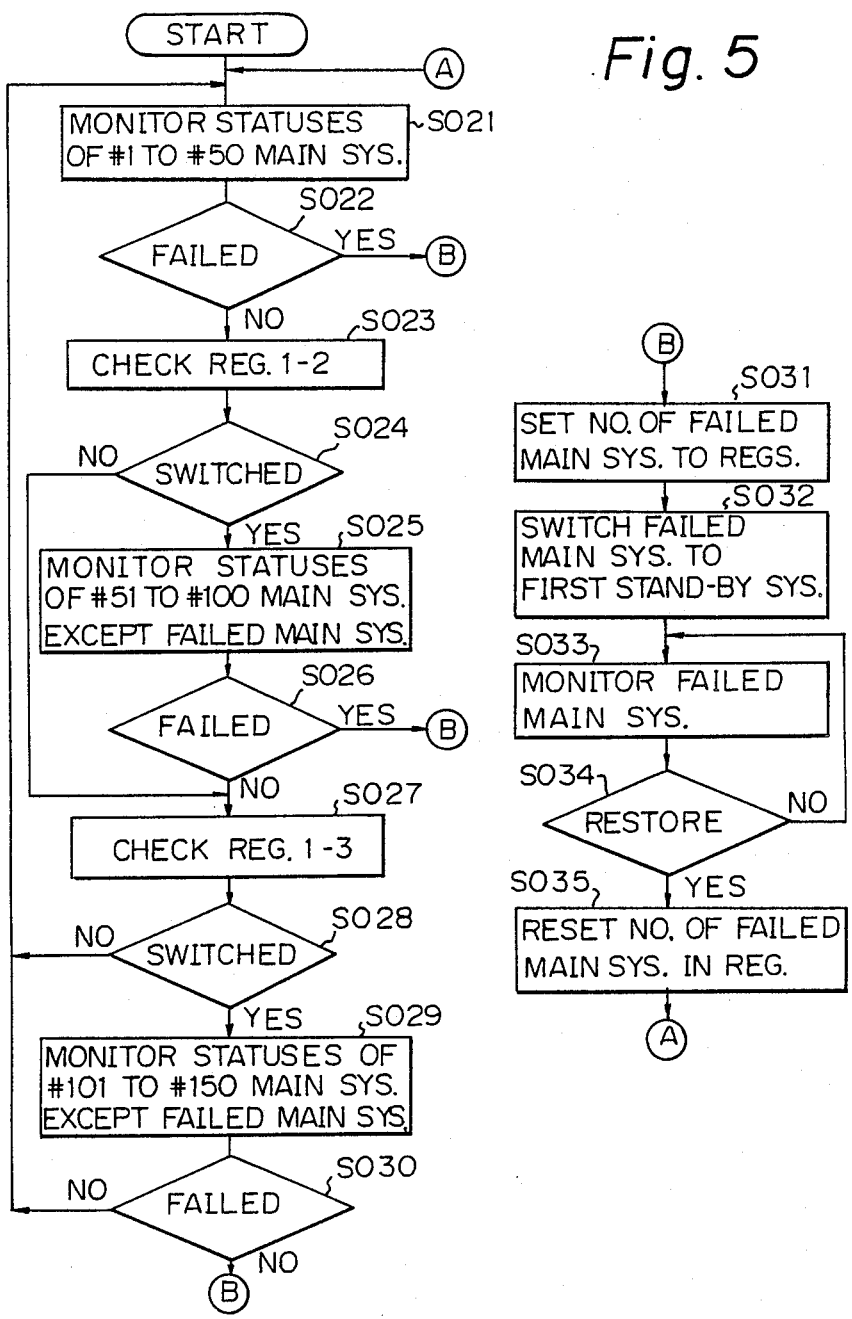
FIG. 5 is a flow chart explaining the switching operation of the reception switching controller shown in FIG. 1.

FIG. 5 shows a flow chart explaining the above monitoring and back-up operation in the reception switching controller, for example, 910. The operations in FIG. 5 correspond to the operations at steps 001 to 003 and steps 004 and 005 in FIG. 2.

Steps 021 and 022 (S021, S022)

The reception switching controller 910 reads statuses of the first to 50th main radio-communication systems and checks whether or not a failure has been occurred in any one of the main radio-communication systems. The above statuses are represented by digital output data from the main radio-communication systems. The reception switching controller 910 can also calculate data error rates of the main radio-communication systems and checks whether or not any one of the data error rates exceeds a predetermined threshold value.

When the reception switching controller 910 detects a failure and/or a high data error, the operation in the reception switching controller 910 is continued to step 031, if not, the flow goes to step 022.

Steps 031 to 034 (S031 to S034)

When the reception switching controller 910 detects a failure in the main radio-communication system, for example, the first main radio-communication system, at step 031 (S031), the CPU 911 in the reception switching controller 910 sets "1", which indicates the number of the failed first main radio-communication system, to the register 1-1 in the register circuit 916. Simultaneously, the CPU 911 in the reception switching controller 910 sends the number "1" of the failed main radio-communication system to the other reception switching controllers 920 and 930, through the serial data transfer unit 915. Upon receipt of the above number, a CPU in the reception switching controller 920 sets the received number to the register 2-2 shown in FIG. 3. At the same time, a CPU in the reception switching controller 930 sets the received number to the register 3-2, as shown in FIG. 3. As a result, the statuses of the registers 1-1 to 1-3, 2-1 to 2-3, and 3-1 to 3-3 are expressed as shown in Table 1.

TABLE 1

| REG 1-1 = 1 | REG 2-1 = 0 | REG 3-1 = 0 |
|---|---|---|
| REG 1-2 = 0 | REG 2-2 = 1 | REG 3-2 = 1 |
| REG 1-3 = 0 | REG 2-3 = 0 | REG 3-3 = 0 |

The statuses of the registers in Table 1 show the following:

REG 1-1=1 indicates that the reception switching controller 910 switches the first main radio-communication system to a back-up mode, by the first stand-by radio-communication system. REG 1-2=0 and REG 1-3=0 indicate that no main radio-communication system has been switched to a back up mode by the second and third reception switching controllers 920 and 930.

REG 2-1=0 indicates that the second switching controller 920 has not switched the main radio-communication system to a back-up mode, by the second stand-by radio-communication system. As described above, REG 2-2=1 indicates that the first main radio-communication system has been switched to the back-up mode of the first stand-by radio-communication system by the first reception switching controller 910. REG 2-3=0 indicates that there is no main radio-communication system has been switched to a back-up mode, by the third stand-by radio-communication system by the third reception switching controller 930.

Indications by REG 3-1=0, REG 3-2=1 and REG 3-3=0 are similar to those of REG 2-1=0, REG 2-2=1, and REG 2-3=0.

At step 032 (S032), the first reception switching controller 910 cooperates with the first transmission switching controller 810 to actually switch the failed first main radio-communication system to the first stand-by radio-communication system. This actual switching was briefly described with reference to steps 004, 011, 012 and 005 (S004, S011, S012 and S005) shown in FIG. 2. As a result, the same data are transmitted in the first main radio-communication system and in the first stand-by radio-communication system.

At steps 033 to 035 (S033 to S035), the first reception switching controller 910 monitors the status of the failed main radio-communication system and restores the status thereof to a normal mode, in which it is not backed-up by the stand-by radio-communication system, when the fail main radio-communication system is restored to a normal state. Thereafter, the CPU 911 in the reception switching controller 910 clears the register 1-1, and transmits a clear data of zero to the reception switching controllers 920 and 930 through the serial data transfer unit 915. The registers 2-2 and 3-2 are also cleared. During the above operation, the reception switching controller 910 does not monitor other main radio-communication systems, but after the operation at step 035, control of the reception switching controller 910 is transferred to step 021.

Steps 023 to 026 (S023 to S026)

At step 022, when the reception switching controller 910 does not detect a failure in the first to 50-th main radio-communication systems, control of the reception switching controller 910 is transferred to the operation at step 023. At step 023, the CPU 911 of the reception switching controller 910 checks the register 1-2. When the register 1-2 is zero indicating that the second reception switching controller 920 has not switched any of the 51-th to 100-th main radio-communication systems, and thus the second reception switching controller 920 monitors those initially allocated main radio-communication systems, the CPU 911 bypasses the operations of steps 025 and 026, and jumps to step 027, which will be described later. When the register 1-2 is not zero but is, for example, 51, indicating that the 51-th main radio-communication system is in the back-up mode, by the second stand-by radio-communication system 6, the CPU 911 in the first reception switching controller 910 monitors the statuses of the 52-th to 100-th main radio communication systems, but does not monitor the failed and backed-up 51-th main radio-communication system, since this main radio-communication system is monitored by the second reception switching controller 920. At step 026, when the CPU 911 detects a failure in one of the 51-th to 100-th main radio-communication systems, for example, the 52-th main radio-communication system, control is transferred to step 031. The operations of the steps 031 to 035 are substantially the same as those set forth above, however, in this case, the registers are set as follows:

TABLE 2

| REG 1-1 = 52 | REG 2-1 = 51 | REG 3-1 = 0 |
|---|---|---|
| REG 1-2 = 51 | REG 2-2 = 52 | REG 3-2 = 52 |
| REG 1-3 = 0 | REG 2-3 = 0 | REG 3-3 = 51 |

The registers 1-2, 2-1 and 3-3 were set at 51 in response to the switching of the 51-th main radio-communication system to the back-up mode of the second stand-by radio-communication system 6, by the second reception switching controller 920. Conversely, the registers 1-1, 2-2 and 3-2 are set at 52, as described above. The relationship among the registers is shown in FIG. 3. Table 2 shows that the 52-th main radio-communication system is in the back-up mode, by the first stand-by radio-communication system, and the 51-th main radio-communication system is in the back-up mode, by the second stand-by radio-communication system. In this case, the first reception switching controller 910 monitors the 52-th main radio-communication system to restore same to a normal mode when it is restored. Also, the second reception switching controller 920 monitors the 51-th main radio-communication system to restore same to a normal mode when it is restored. The third reception switching controller 930 monitors the first to 50-th, and 53-th to 150-th main radio-communication systems.

Steps 027 to 030 (S027 to S030)

When the CPU 911 does not detect fail in the 1st to 50-th and 51-th to 100-th main radio-communication systems, the CPU 911 checks the register 1-3 to detect the switching by the third reception switching controller 930. The operations of steps 027 to 030 are substantially the same as those of steps 023 to 026, and thus a description thereof is omitted.

A pair of transmission and reception switching controllers, for example, 810 and 910, and a pair of switches, for example, 111 and 131, in the transmission side and the reception side switching circuit units 400 and 410 can switch between the first stand-by and the first main radio-communication systems. In addition, each pair of switching controllers operates substantially independently from the other pairs thereof without an interfacing by the status data set in the registers. Furthermore, each pair of the switching controllers can switch from a failed main radio-communication system of all main radio-communication systems, except for an already failed and backed-up main radio-communication system, to a stand-by radio-communication system defined by the switching controllers. Accordingly, if three main radio-communication systems are simultaneously failed, these main radio-communication systems are independently and simultaneously backed-up within 10 ms.

In the above embodiments, the communication of the status data to be stored into the registers 1-2, 1-3, 2-2, 2-3, 3-2 and 3-3 is carried out by using the serial data transfer unit 915 as a simple data transfer media. The communication can also be carried out by a variety of methods: for example, by providing the shared memory 919 commonly connected to and being directly accessible by all of the reception switching controllers 910, 920 and 930, the communication among the switching controllers can be carried out more easily and more rapidly.

In FIG. 1, three independently operable reception switching controllers 910, 920, and 930, which are formed by microcomputers, are provided. These switching controllers can be replaced by a single computer in which a plurality of tasks can be operated independently in a real time operation mode under an operating system, and each task performs the above operation described with reference to FIG. 5. Three independently operable transmission switching controllers 810, 820 and 830 can also be replaced by a single computer, similar to the above.

In the above, a typical monitoring and back-up operation were described, but many combinations of the monitoring and back-up operation can be carried out. For example, if the plurality of main radio-communication systems is equivalently divided into a plurality of monitoring groups, the number thereof being equal to the number of the second switching controllers, other second switching controllers carry out a further monitoring of a plurality of main radio-communication systems approximately equivalently divided from the main radio-communication systems in the monitoring group monitored by the failure detecting second switching controller in the normal condition.

The digital radio-communication system shown in FIG. 1 can be formed as a two way radio-communication system. Accordingly, a plurality of additional main radio-communication systems having constructions symmetrical to those of the main radio-communication systems 1 to 3 shown in FIG. 1, and a plurality of additional stand-by radio-communication systems having constructions symmetrical to those of the stand-by radio-communication systems 5 to 7 shown in FIG. 1 are provided, and the switching is carried out thereto in the same way as that described above. The additional main radio-communication system can be used for the auxiliary main radio-communication system during the switching for the main radio-communication systems, and conversely, the main radio-communication system can be used for an auxiliary main radio-communication during the switching for the additional main radio-communication systems.

Many widely different embodiments of the present invention may be constructed without departing from the spirit and scope of the present invention, and it should be understood that the present invention is not restricted to the specific embodiments described above, except as defined in the appended claims.

I claim:

1. A digital radio-communication system comprising:

a plurality of main radio-communication systems, each including a main data transmission circuit means provided at a first side, a main space data transmission line, and a main data reception circuit means provided at a second side and operatively connected to said main data transmission circuit means through said main space data transmission line;

a plurality of stand-by radio-communication systems provided for backing-up said main radio-communication systems, each including a stand-by data transmission circuit means provided at said first side, a stand-by data transmission line, and a stand-by data reception circuit means provided at said second side and operatively connected to said stand-by data transmission circuit means through said stand-by data transmission line;

a first switching circuit means provided among said main and stand-by radio-communication systems at said first side, and including a plurality of first switching circuits for switching between said main and stand-by radio-communication systems at said first side;

a second switching circuit means provided among said main and stand-by radio-communication systems at said second side, and including a plurality of second switching circuits for switching between said main and stand-by radio-communication systems at said second side; and channel switching means including a plurality of pairs of switching means, the number thereof being equal to the number of said stand-by radio-communication systems, and said plurality of pairs of switching means being independently operable from one another, each pair of said switching means including a plurality of first switching means provided at said first side to activate said first switching circuits, and a plurality of second switching means provided at said second side to activate said second switching circuits and cooperating with said plurality of first switching means, each of said second switching means monitoring statuses of a plurality of said main radio-communication systems, and sending a switching command to said corresponding first switching means when a failure in a main radio-communication system is detected, said corresponding first switching means activating a first switching circuit in said first switching circuit means to transmit transmission data, which are equivalent to those data transmitted through the failed main radio-communication system, through a stand-by radio-communication system which is defined in connection with said first and second switching means, in response to said switching command sent from said second switching means, and said second switching means activating a second switching circuit in said switching circuit means to receive said data transmitted through said stand-by radio-communication system, at said second side, in response to said switching at said corresponding first switching means, wherein said second switching means monitors only said failed main radio-communication system backed-up by said stand-by radio-communication system to detect a restoration of said failed main radio-communication system, and restores said failed main radio-communication system to a normal mode in which it is not backed-up by said stand-by radio-communication system when said failed main radio-communication system is returned to a normal state, wherein said plurality of main radio-communication systems is divided into a plurality of monitoring groups, the number thereof being equal to the number of the second switching means, wherein each of said second switching means monitors a plurality of main radio-communication systems in a corresponding monitoring group in a normal condition, wherein, when at least one of said second switching means detects a failed main radio-communication system and monitors said failed main radio-communication system to restore said failed main radio-communication system when returned to normal, the other second switching means monitors said main radio-communication systems in a corresponding monitoring group, and further, monitors said main radio-communication systems in the monitoring group monitored by said failure detecting second switching means in the normal condition, except for said failed main radio-communication system and carries out back-up operation by using stand-by radio-communication systems defined by said other second switching means together with the corresponding first switching means when detecting a failure in said further monitoring main radio-communication systems.

2. A digital radio-communication system according to claim 1, wherein said second switching means sends a restore switching command to said corresponding first switching means when said failed main radio-communication system is restored, wherein said corresponding first switching means activates said first switching circuit in said first switching circuit means to cut an application of said transmission data, which are equivalent to those data transmitted through the restored main radio-communication system, through said stand-by radio-communication system, in response to said restore switching command sent from said second switching means, and, wherein said second switching means activates said second switching circuit in said second switching circuit means to cut data transmitted through said stand-by radio-communication system at said second side, in response to said switching at said corresponding first switching means.

3. A digital radio-communication system according to claim 1, wherein a next second switching means carries out said further monitoring of said main radio-communication systems in the monitoring group monitored by said failure detecting second switching means in the normal condition, except for said failed main radio-communication system.

4. A digital radio-communication system according to claim 1, wherein said other second switching means carry out said further monitoring of a plurality of main radio-communication systems approximately equivalently divided from said main radio-communication systems in the monitoring group monitored by said failure detecting second switching means in the normal condition.

5. A digital radio-communication system according to claim 1, wherein a communication of which main radio-communication system is failed and backed-up from the second switching means detecting the failed main radio-communication system to other second switching means, is carried out by indicating the number of the failed main radio-communication system, and another communication of which main radio-communication system is restored from the second switching means detecting the restored main radio-communication system to said other second switching means is carried out by indicating a special datum.

6. A digital radio-communication system according to claim 1, wherein each second switching means comprises a single micro computer operating independently from other microcomputers, and having a data transmission and reception means for performing said communication, and wherein each first switching means comprises a single micro computer operating independently from said other microcomputers.

7. A digital radio-communication system according to claim 1, wherein said plurality of second switching means is formed by a single computer which performs multi-tasks for said monitoring and switching in parallel in real time, and
wherein said plurality of first switching means is formed by another single computer which performs multi-tasks for said switching in parallel in real time.

8. A digital radio-communication system according to claim 1, wherein each of said main data transmission circuit means comprises a main modulator, a main transmitter, and a main antenna, and each of said main data reception means comprises another main antenna, a main receiver, and a main demodulator,
wherein each of said stand-by data transmission circuit means comprises a stand-by modulator equivalent to said main modulator, a stand-by transmitter equivalent to said main transmitter, and a stand-by antenna, and each of said stand-by data reception means comprises another stand-by antenna, a stand-by receiver equal to said main receiver, and a stand-by demodulator equal to said main demodulator, and
wherein said first switching circuits in said first switching circuit means are operatively connected to said plurality of main modulators and said plurality of stand-by modulators, and said second switching circuits in said second switching circuit means are operatively connected to said plurality of main demodulators and said plurality of stand-by demodulators.

9. A digital radio-communication system according to claim 1, further comprising:
a plurality of second main radio-communication systems, each including a second main data transmission circuit means provided at said second side and having a same circuit configuration as that of said main data transmission circuit, a main second space data transmission line, and a second main data reception circuit means provided at said first side, having a same circuit as that of said main data reception circuit means, and operatively connected to said main data transmission circuit means through data main space data transmission line;
a plurality of second stand-by radio-communication systems provided for backing-up said second main radio-communication systems, each including a second stand-by data transmission circuit means provided at said second side and having a same circuit as that of said stand-by data transmission circuit means, a second stand-by space data transmission line, and a second stand-by data reception circuit means provided at said first side, having a same circuit as that of said stand-by data reception circuit means, and operatively connected to said second stand-by data transmission circuit means through said second stand-by space data transmission line;
a third switching circuit means provided among said second main and second stand-by radio-communication systems and at said second side, and including a plurality of third switching circuits for switching between said second main and second stand-by radio-communication systems at said second side, each third switching circuit having a circuit configuration similar to that of said first switching circuit;
a fourth switching circuit means provided among said second main and second stand-by radio-communication systems and at said first side, and including a plurality of fourth switching circuits for switching between said second main and second stand-by radio-communication systems at said first side, each fourth switching circuit having a circuit configuration similar to that of said second switching circuit;
said auxiliary radio-communication system being one of said second main radio-communication systems; and
second channel switching means including a plurality of pairs of switching means, the number thereof being equal to the number of said second stand-by radio-communication systems, and said plurality of switching means being independently operable from one another, each pair of said switching means including a third switching means having a same circuit configuration as that of said first switching means and provided at said second side to activate said third switching circuits, and a fourth switching means having a same circuit configuration as that of said second switching means and provided at said first side to activate said fourth switching circuits and cooperating with said third switching means through said one of said main radio-communication systems, as the auxiliary radio-communication system.

* * * * *

UNITED STATES PATENT AND TRADEMARK OFFICE
CERTIFICATE OF CORRECTION

PATENT NO.  : 4,985,904

DATED       : January 15, 1991

INVENTOR(S) : Akihiro Ogawara

It is certified that error appears in the above-identified patent and that said Letters Patent is hereby corrected as shown below:

Title Page   under "U.S. Patent Documents" insert
  --4,644,301 2/87 Hecht 333/101--
             under "Foreign Patent Documents" insert
  --EP-A-0 225 643 12/10/86 EPO
    EP-A-0 032 327 11/28/80 EPO
    EP-A-0 006 214  6/12/79 France--.

Title Page   insert --Other Documents
    Patent Abstracts of Japan, vol. 10, no. 99,
    (E-396) [2156], 16th April; & JP-A-60 240 225
    (Fujitsu K.K.) 29-11-1985.--

Col. 3, line  6, change "actives" to --activates--;
        line 20, delete "of" (1st Occurence);
        line 47, change "fail" to --failed--;
        line 60, change "others," to --other,--.

Col. 4, line 18, change "o" to --of--;
        line 68, change "others" to --other--.

Signed and Sealed this

Twenty-ninth Day of December, 1992

Attest:

DOUGLAS B. COMER

Attesting Officer           Acting Commissioner of Patents and Trademarks